United States Patent
Wu

(10) Patent No.: US 9,685,062 B2
(45) Date of Patent: Jun. 20, 2017

(54) ELECTRONIC DEVICE, SECURITY WARNING SYSTEM AND METHOD

(71) Applicant: Chiun Mai Communication Systems, Inc., New Taipei (TW)

(72) Inventor: Tang-Wei Wu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/983,614

(22) Filed: Dec. 30, 2015

(65) Prior Publication Data

US 2017/0092092 A1 Mar. 30, 2017

(30) Foreign Application Priority Data

Sep. 25, 2015 (CN) .......................... 2015 1 0618573

(51) Int. Cl.
*G01C 22/00* (2006.01)
*G08B 21/02* (2006.01)
(52) U.S. Cl.
CPC .................................... *G08B 21/02* (2013.01)
(58) Field of Classification Search
CPC ............................ A61B 5/1123; G01C 22/006
USPC ............................................. 340/573.1, 944
See application file for complete search history.

(56) References Cited

U.S. PATENT DOCUMENTS

| 2012/0032806 A1* | 2/2012 | Lee ........................ G08B 23/00 340/573.1 |
| 2016/0091606 A1* | 3/2016 | Shin ....................... G01S 15/025 367/112 |
| 2016/0265917 A1* | 9/2016 | Yamamoto .......... G01C 21/3655 |

* cited by examiner

*Primary Examiner* — Kevin Kim
(74) *Attorney, Agent, or Firm* — Steven Reiss

(57) ABSTRACT

A security warning system applied in an electronic device includes a motion identifying unit, a walking speed calculation unit, an image processing unit, and an executing unit. The motion identifying unit identifies whether a number of continuous walking steps of a user of the electronic device is greater than a first predetermined value. The walking speed calculation unit calculates a walking speed of the user and compares the calculated walking speed to a second predetermined value. The image processing unit determines whether the user is in a special sidewalk. The executing unit determines whether the user is in a walking state and whether the electronic device needs to execute a security mode. An electronic device and a security warning method are also provided.

12 Claims, 2 Drawing Sheets

ELECTRONIC DEVICE, SECURITY WARNING SYSTEM AND METHOD

FIELD

The subject matter herein generally relates to an electronic device, a security warning system, and a security warning method.

BACKGROUND

Portable electronic devices are widely used in daily life. When people uses portable electronic device in some public places, such as in public transportation, on a busy street, there are some potential dangerous for the user to the busy environment.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
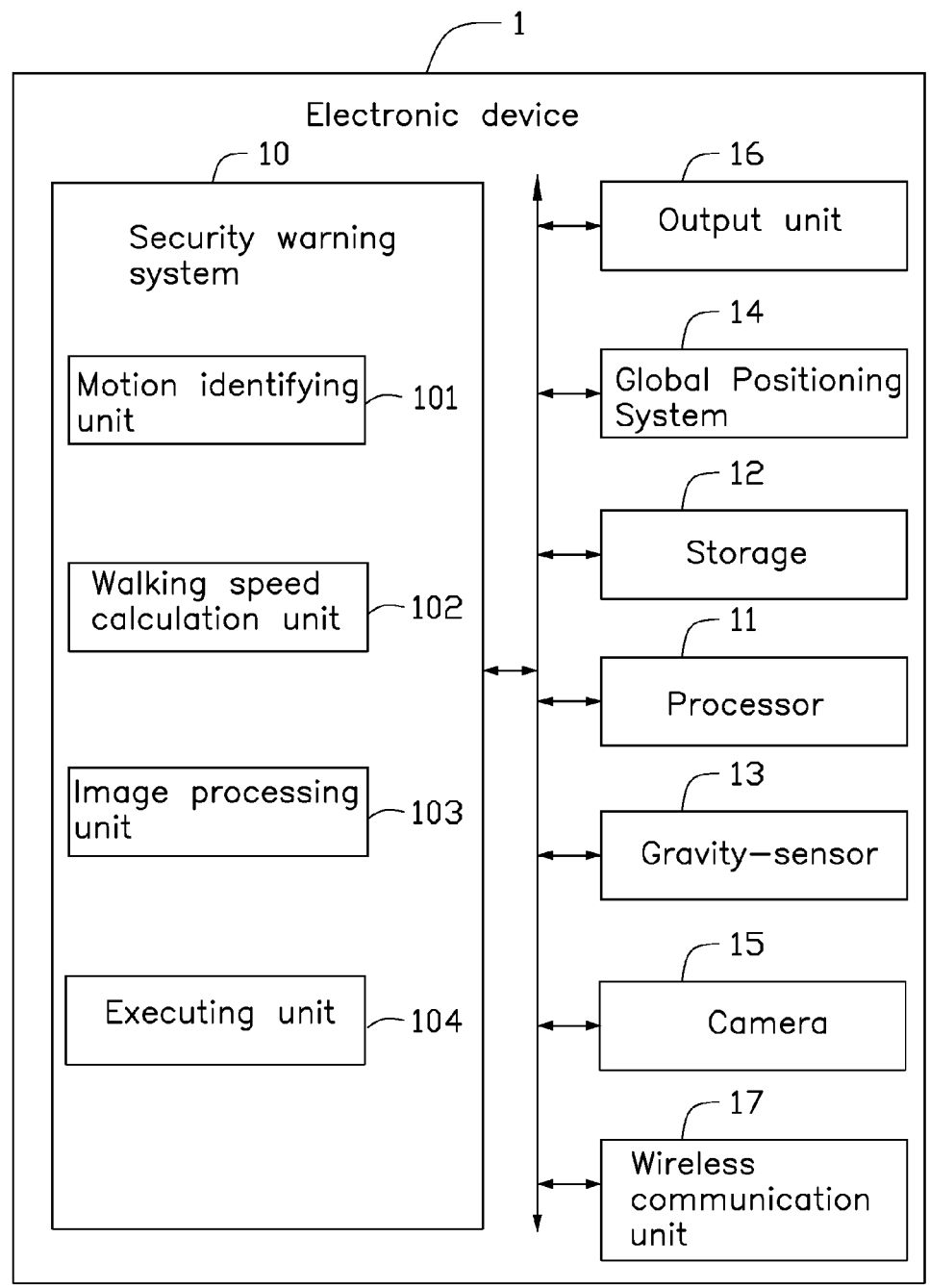
FIG. 1 is a block diagram of one embodiment of a security warning system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates one embodiment of a security warning system 10 applied in an electronic device 1. The electronic device 1 can be a mobile phone, a smart watch, a personal digital assistant, and a tablet computer. The electronic device 1 includes a processor 11, a storage 12, a Gravity-sensor (G-sensor) 13, a Global Positioning System (GPS) 14 and a camera 15.

The processor 11 can be a single chip microcomputer or other micro integrated circuits. The storage 12 can be a memory of the electronic device 1 or an external storage device, such as a Smart Media Card, a Secure Digital Card, or a Random-Access Memory (RAM), connected to the electronic device 1. The G-sensor 13 is configured to detect acceleration on multiple directions, including a vertical direction and a horizontal direction, of the electronic device 1 to collect motion parameter of the electronic device user. The GPS 14 is configured to locate the electronic device 1 to collect displacements in the horizontal direction of the electronic device user. The camera 15 is configured to capture images. In at least one embodiment, special sidewalks for electronic device users may be built by government with some arrows on the sidewalks for guiding. The camera 15 can capture images of the arrows.

The security warning system 10 includes a motion identifying unit 101, a walking speed calculation unit 102, an image processing unit 103 and an executing unit 104. The security warning system 10 can be installed in an operation system of the electronic device 1 or stored in the storage 12 and executed by the processor 11. In at least one embodiment, the electronic device 1 can be a smart mobile phone having an output unit 16, such as a speaker, a display and a vibrator, and a wireless communication unit 17.

The motion identifying unit 101 is configured to identify whether a number of continuous walking steps of the user is greater than a first predetermined value, such as 5 steps, according to the motion parameter collected by the G-sensor 13. When the number of continuous walking steps of the user is greater than the first predetermined value, the motion identifying unit 101 outputs a first determination. When the number of continuous walking steps of the user is smaller than the first predetermined value and the user stops walking for a period of time longer than a threshold, such as 5 seconds, the motion identifying unit 101 outputs a second determination, meanwhile, the G-sensor 13 recollect the number of continuous walking steps of the user.

The walking speed calculation unit 102 is configured to calculate a walking speed of the user according to the displacement in horizontal direction of the user collected by the GPS 14. Meanwhile, the walking speed calculation unit 102 is configured to compare the calculated walking speed with a second predetermined value, such as 20 km/h, to determine whether the calculated walking speed is greater than the second predetermined value. When the calculated walking speed is greater than the second predetermined value, the walking speed calculation unit 102 may determine that the user is in a public transportation or driving a car and further outputs a third determination. When calculated walking speed is smaller than the second predetermined value, the walking speed calculation unit 102 may determine that the user is walking and further outputs a fourth determination.

The image processing unit 103 is configured to determine whether the user is in the special sidewalks according to image captured by the camera 15. For instance, the image processing unit 103 may capture the arrows in the special sidewalks using image identifying technology, such as edge detection, and compares with several predetermined arrows, thereby determining the user is walking in the special sidewalks. When camera 15 does not capture the arrows, the image processing unit 103 determines the user is not in the special sidewalks. When the camera 15 captures arrows in positive direction, the image processing unit 103 determines the user is walking in forward direction. When the camera 15 captures arrows in negative direction, the image processing unit 103 determines the user is walking in reverse direction.

The executing unit 104 is configured to determine whether execute a security mode for the electronic device 1 according to determine results of the motion identifying unit 101, the walking speed calculation unit 102, and the image processing unit 103. Normally, the G-sensor 13 is background operated in the electronic device 1. When the motion identifying unit 101 outputs the first determination, the executing unit 104 activates the GPS 14. When the walking speed calculation unit 102 outputs the third determination, the executing unit 104 determines the user is not in a walking state; when the walking speed calculation unit 102 outputs the fourth determination, the executing unit 104 determines the user is in a walking state and activates the camera 15.

Furthermore, when the image processing unit 103 determines the user is not in the special sidewalks, the executing unit 104 executes the security mode for the electronic device 1. In at least one embodiment, the security mode can be the electronic device 1 with only telephone function and SMS function enabled but other functions disabled. In another embodiment, the security mode can be the electronic device 1 with only telephone function, SMS function and internet download function enabled but other functions, such as game function, video function, and social network function, disabled. In one more embodiment, the functions of the electronic device 1 can be divided into a first category function and a second category function. The security mode can be the electronic device 1 with the first category function enabled and the second category function disabled. Subsequently, the executing unit 104 outputs a first control command to the output unit 16 to control the output unit 16 to output a first warning signal, such as broadcasting audio via a speaker to notice the user to avoid transportation accidents.

When the image processing unit 103 determines the user is walking in reverse direction in the special sidewalks, the executing unit 104 controls the electronic device 1 not to execute the security mode, and further outputs a second control command to control the output unit 16 to output a second warning signal, such as vibrating via the vibrator to notice the user is walking in reverse direction.

When the image processing unit 103 determines the user is walking in forward direction in the special sidewalks, the executing unit 104 controls the electronic device 1 not to execute the security mode.

Figure 2:
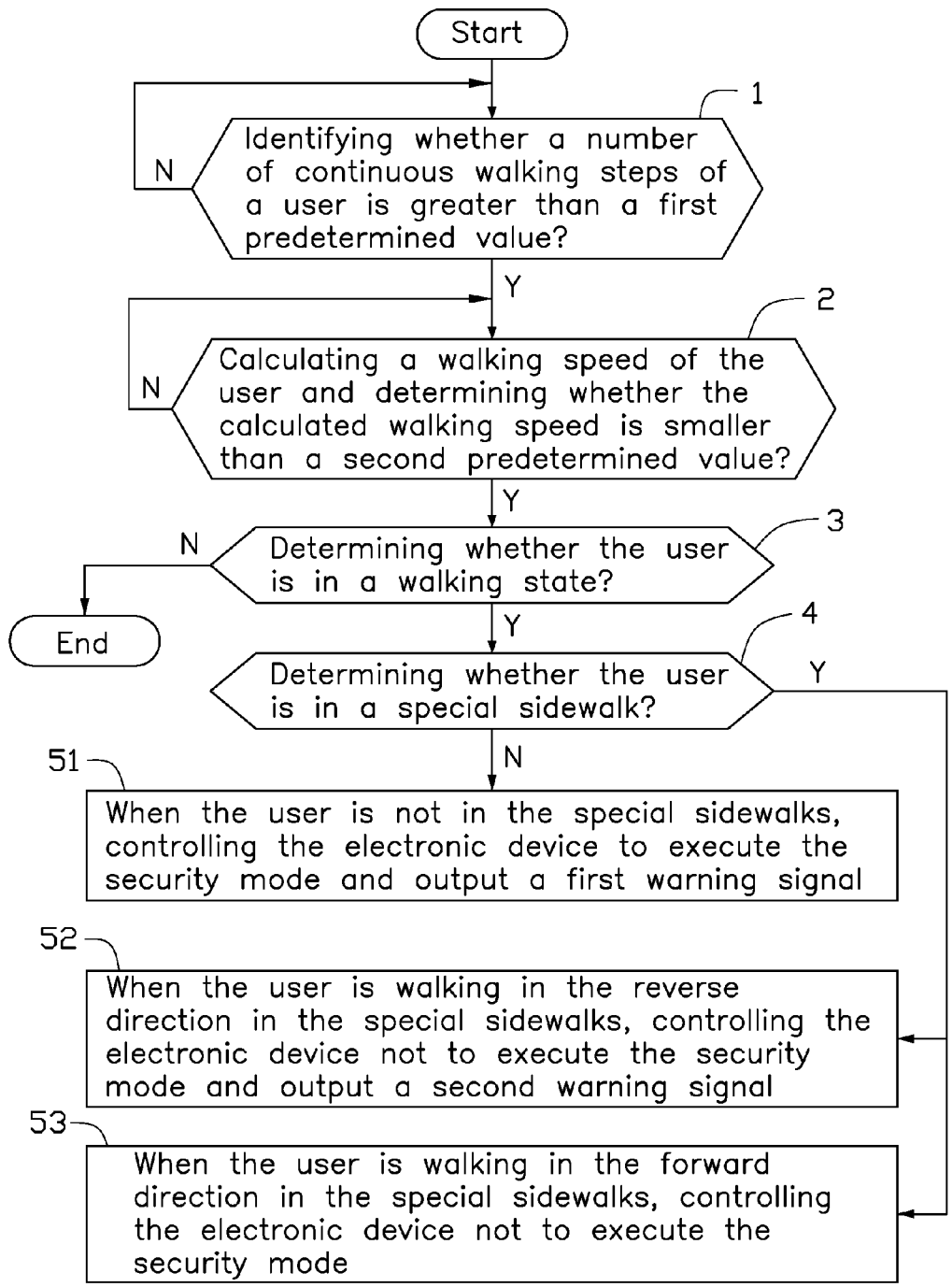
FIG. 2 is a flow chart of one embodiment of a security warning method.

FIG. 2 illustrates a security warning method of the electronic device 1 described as follows:

At block 1, the motion identifying unit 101 identifies whether the number of continuous walking steps of the user is greater than the first predetermined value according to the motion parameter collected by the G-sensor 13. When the number of continuous walking steps of the user is greater than the first predetermined value, the motion identifying unit 101 outputs the first determination, and then a block S2 is executed. When the number of continuous walking steps of the user is smaller than the first predetermined value and the user stops walking for a period of time longer than the threshold, the motion identifying unit 101 outputs the second determination.

At block 2, the walking speed calculation unit 102 calculates the walking speed of the user according to the displacement in horizontal direction of the user collected by the GPS 14. Meanwhile, the walking speed calculation unit 102 is configured to compare the calculated walking speed with the second predetermined value. When the calculated walking speed is greater than the second predetermined value, the walking speed calculation unit 102 outputs a third determination. When calculated walking speed is smaller than the second predetermined value, the walking speed calculation unit 102 outputs a fourth determination, and then a block S3 is executed.

At block 3, the executing unit 104 determines whether the user is in the walking state according to the determination result outputted by the walking speed calculation unit 102. When the walking speed calculation unit 102 outputs the fourth determination, the executing unit 104 determines the user is in walking state, and then a block S4 is executed. Otherwise, the method ends.

At block 4, the image processing unit 103 determines whether the user is in the special sidewalks according to image captured by the camera 15, and then secondary blocks S51, S52 or S53 are executed.

At secondary block 51, when the image processing unit 103 determines the user is not in the special sidewalks, the executing unit 104 control the electronic device 1 to execute the security mode. Meanwhile, the executing unit 104 outputs a first control command to the output unit 16 to control the output unit 16 to output a first warning signal.

At secondary block 52, when the image processing unit 103 determines the user is walking in the reverse direction in the special sidewalks, the executing unit 104 control the electronic device 1 not to execute the security mode, and further outputs the second control command to control the output unit 16 to output the second warning signal.

At secondary block 53, when the image processing unit 103 determines the user is walking in the forward direction in the special sidewalks, the executing unit 104 controls the electronic device 1 not to execute the security mode.

The security warning system 10 and the security warning method determine whether the user is in the special sidewalks, otherwise to warning the user to pay attention to the environment, which improves security index for electronic device users.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A security warning system applied in an electronic device, the security warning system comprising:
    a motion identifying unit configured to identify whether a number of continuous walking steps of a user of the electronic device is greater than a first predetermined value;
    a walking speed calculation unit configured to calculate a walking speed of the user and compare the calculated walking speed to a second predetermined value;
    an image processing unit configured to determine whether the user is in a special sidewalk; and
    an executing unit configured to determine whether the user is in a walking state and whether the electronic device needs to execute a security mode;
    wherein if the number of continuous walking steps of the user is greater than the first predetermined value and the walking speed is smaller than the second predetermined value, the executing unit determines that the user is in the walking state; and
    wherein when the user is in the walking state but not in the special sidewalk, the executing unit controls the electronic device to execute the security mode.

2. The security warning system as claimed in claim 1, wherein if the image processing unit determines the user is not in the special sidewalk, the executing unit outputs a first control command to control the electronic device to output a first warning signal.

3. The security warning system as claimed in claim 1, wherein if the image processing unit determines the user is walking in a reverse direction in the special sidewalk, the executing unit outputs a second control command to control the electronic device to output a second warning signal.

4. The security warning system as claimed in claim 1, wherein if the image processing unit determines the user is walking in the special sidewalk, the executing unit controls the electronic device not to execute the security mode.

5. The security warning system as claimed in claim 1, wherein if the executing unit executes the security mode, the electronic device enables a first category of functions and disables a second category of functions; if the executing unit controls the electronic device not to execute the security mode, the electronic device enables all functions.

6. An electronic device comprising:
a Gravity-sensor (G-sensor) configured to collect motion parameter of a user of the electronic device;
a Global Positioning System (GPS) configured to collect a displacement of the user in a horizontal direction;
a camera configured to capture images; and
a processor configured to identify whether a number of continuous walking steps of the user is greater than a first predetermined value according to the motion parameter collected by the G-sensor; the processor configured to calculate a walking speed of the user according to the displacement collected by the GPS and compare the calculated walking speed to a second predetermined value; the processor configured to determine whether the user is in a special sidewalk according to the images captured by the camera; and the processor configured to determine whether the user is in a walking state and whether the electronic device needs to execute a security mode;
wherein if the number of continuous walking steps of the user is greater than the first predetermined value and the walking speed is smaller than the second predetermined value, the processor determines the user is in the walking state; and
wherein when the user is in the walking state but not in the special sidewalk, the processor controls the electronic device to execute the security mode.

7. The electronic device as claimed in claim 6, wherein if the number of continuous walking steps of the user is greater than the first predetermined value, the processor activates the GPS, if the calculated walking speed is smaller than the second predetermined value, the processor activates the camera.

8. A security warning method applied in an electronic device, the security warning system comprising:
identifying whether a number of continuous walking steps of a user of the electronic device is greater than a first predetermined value;
calculating a walking speed of the user and compare the calculated walking speed to a second predetermined value;
determining whether the user is in a special sidewalk; and
determining whether the user is in a walking state and whether the electronic device needs to execute a security mode;
wherein if the number of continuous walking steps of the user is greater than the first predetermined value and the walking speed is smaller than the second predetermined value, the executing unit determines the user is in the walking state; if the user is in the walking state but not in the special sidewalk, the executing unit controls the electronic device to execute the security mode.

9. The security warning method as claimed in claim 8, wherein if determining the user is not in the special sidewalk, then outputting a first control command to control the electronic device to output a first warning signal.

10. The security warning method as claimed in claim 8, wherein if determining the user is walking in a reverse direction in the special sidewalk, then outputting a second control command to control the electronic device to output a second warning signal.

11. The security warning method as claimed in claim 8, wherein if determining the user is walking in the special sidewalk, then controlling the electronic device not to execute the security mode.

12. The security warning method as claimed in claim 8, wherein if executing the security mode, the electronic device enables a first category of functions and disables a second category of functions; if not executing the security mode, the electronic device enables all functions.

* * * * *